United States Patent [19]

Shimizu et al.

[11] 4,337,334

[45] Jun. 29, 1982

[54] PROCESS FOR PRODUCTION OF PHENOLIC RESIN FROM BISPHENOL-A BY-PRODUCTS

[75] Inventors: Yoshiro Shimizu, Nagoya; Toshio Itakura, Okazaki; Mitsuhiro Iwasa, Hino; Kunio Hanauye, Yokohama, all of Japan

[73] Assignee: Mitsui Toatsu Chemicals Inc., Tokyo, Japan

[21] Appl. No.: 233,225

[22] Filed: Feb. 10, 1981

[51] Int. Cl.³ .......................... C08G 8/20; C08G 8/24
[52] U.S. Cl. .................................... 528/137; 528/129; 528/143; 528/144; 528/153; 528/154; 528/155
[58] Field of Search ............... 528/144, 153, 155, 129, 528/137, 143, 154

[56] References Cited

U.S. PATENT DOCUMENTS 3,862,089  1/1975  Shinohara et al. ............. 528/129 X
4,018,739  4/1977  Okamoto et al. ............... 528/155 X
4,179,429  12/1979  Hanauye et al. ................ 528/153 X Primary Examiner—Howard E. Schain
Attorney, Agent, or Firm—Fisher, Christen & Sabol

[57] ABSTRACT

A process for producing a phenolic resin comprising condensing a phenol component and an aldehyde component, characterized in that the phenol component comprises (high-molecular-weight phenolic compounds which are left after bisphenol A-containing by-products formed in the production of bisphenol A by condensing acetone and phenol in the presence of an acid catalyst are treated at a high temperature of at least 150° C. in the presence of an alkaline catalyst to remove low-boiling components therefrom.

7 Claims, No Drawings

PROCESS FOR PRODUCTION OF PHENOLIC RESIN FROM BISPHENOL-A BY-PRODUCTS

This invention relates to a new process for producing a phenolic resin by using as a phenol component phenolic compounds obtained as by-products in the production of bisphenol A.

Phenolic resins include novolaks obtained by condensing a phenol component such as phenol and/or cresol and an aldehyde component such as formaldehyde in the presence of an acid catalyst, and resols obtained by condensing the above two components in the presence of an alkaline catalyst. They find extensive use as molded articles or as binders for the production of foundry molds, abrasives, brakes, laminates, etc.

Conventional phenolic resins obtained by using phenol and/or cresol as a phenol component, however, do not completely meet all of the requirements in various uses. For example, molded articles prepared from these phenolic resins generally have poor flexural strength, and when such a phenolic resin is used as a binder for foundry molds, cracking of the molds tends to occur.

It is an object of this invention therefore to provide a new process for producing a phenolic resin free from the aforesaid defects of the conventional phenolic resins.

According to this invention, there is provided a process for producing a phenolic resin, characterized by using as a phenol component high-molecular-weight phenolic compounds which are left after bisphenol A-containing by-products formed in the production of bisphenol A by condensing acetone and phenol in the presence of an acid catalyst are treated at a temperature of at least 150° C. in the presence of an alkaline catalyst to remove low-boiling components therefrom.

The high-molecular-weight phenolic compounds used as the phenol component in the process of this invention are products which remain after the by-product residue formed in the production of bisphenol A is treated at a high temperature in the presence of an alkaline catalyst to cleave it and distill off the resulting isopropenyl phenol and phenol. More specifically, these compounds are obtained by the following procedure.

Bisphenol A is produced by dehydrocondensing phenol and acetone in the presence of an acid catalyst such as hydrochloric acid, sulfuric acid, p-toluenesulfonic acid or an acidic ion exchange resin. When bisphenol A is separated from the reaction mixture by a usual procedure such as distillation or recrystallization from an organic solvent or water, there is left a residue containing dihydroxydiphenylpropane isomers, a chromane compound called chromane I, other polyphenol compounds and a small amount of bisphenol A (to be referred to as a residue). When the residue is treated at a high temperature of at least 150° C., preferably 180° to 250° C., under a reduced pressure of not more than 100 mmHg in the presence of an alkaline catalyst, the hydroxydiphenyl propane in the residue undergoes a cleavage reaction to form phenol and isopropenyl phenol. These cleavage products distill off from the reaction mixture and black tarry high-molecular-weight phenolic compounds remain. In the process of this invention, a phenolic resin is produced by using these high-molecular-weight phenolic compounds as a phenol component.

Preferably, phenol is used in combination with the high-molecular-weight phenolic compounds as the phenol component in producing a phenolic resin by the process of the invention. In this case, the amount of phenol is usually 20 to 90% by weight based on the total weight of the phenol and the high-molecular-weight phenolic compounds.

Suitable catalysts used in the condensation reaction of the phenol component with formaldehyde in the invention are acid catalysts such as hydrochloric acid, sulfuric acid and oxalic acid. The amount of the acid catalyst is preferably in the range of 0.01 to 2 parts by weight per 100 parts by weight of the phenol component, i.e. the high-molecular-weight phenolic compounds or a mixture of these with phenol, as in the production of ordinary phenolic resins.

The other conditions in the condensation reaction can be set according to usual manufacturing conditions for phenolic resins. Specifically, the proportion of formaldehyde used is 0.5 to 1.5 moles per mole of the phenol component. The reaction temperature is usually 50° to 100° C., and the reaction time is 1 to 15 hours, usually 2 to 6 hours.

If required, the catalyst is neutralized after the condensation reaction, and subsequently, the reaction mixture is dehydrated and the unreacted phenol removed. Thus, a novolak-type phenolic resin is obtained.

The phenolic resin obtained by the process of the invention can be used in the same applications by the same methods as conventional phenolic resins. For example, when it is to be used as a molding material, the phenolic resin is mixed with hexamethylenetetramine, a filler, etc. and the mixture is cured under heat and pressure to form a molded article. The resulting molded article is characterized by having improved flexural strength over a molded article prepared from a conventional phenolic resin. Furthermore, it is noted interestingly that in injection molding, the phenolic resin in accordance with this invention shows greatly improved heat stability within the cylinder of the injection molding machine.

For the production of a foundry mold, the phenolic resin obtained by this invention is used as a binder and is mixed with required materials including sand particles, hexamethylenetetramine and a lubricant, and the resulting resin-coated sand is heated in a mold. The foundry mold thus obtained has higher flexural strength and crack resistance than that obtained by using an ordinary phenolic resin as a binder.

The phenolic resin in accordance with this invention may be used as a binder for glass fibers, paper, etc., as well. Furthermore, a foamed phenolic resin may be prepared from it.

The phenolic resin of the invention has a slower speed of curing than conventional ones, and this is presumably one of the causes of its increased stability within the cylinder of an injection molding machine during injection molding. If desired, its curing speed may be increased by adding a curing accelerator such as an alkaline earth metal oxide or hydroxide or various organic acids.

The following Examples illustrate the process of this invention more specifically. All parts and percentages in these examples are by weight.

EXAMPLE 1

A. Production of phenolic resins

Resin I

A reactor was charged with 700 parts of phenol, 300 parts of high-molecular-weight phenolic compounds, 450 parts of a 37% aqueous solution of formaldehyde and 7.5 parts of oxalic acid, and with stirring, they were heated. In 35 minutes, refluxing began. Under reflux, the reaction was further carried out for 90 minutes. After the reaction, dehydration and the removal of the unreacted phenol were performed in a customary manner to afford 965 parts of a resin having a softening point of 93° C.

Resin II

The procedure of producing the resin I was repeated except that 500 parts of phenol, 500 parts of the high-molecular-weight phenolic compounds and 371 parts of a 37% aqueous solution of formaldehyde were charged. There was obtained 883 parts of a resin having a softening point of 105.5° C.

Resin III

The procedure of producing the resin I was repeated except that 300 parts of phenol, 700 parts of the high-molecular-weight phenolic compounds and 239 parts of a 37% aqueous solution of formaldehyde were charged. There was obtained 979 parts of a resin having a softening point of 109.5° C.

Resin IV (comparison)

A reactor equipped with a stirrer, a reflux condenser and a thermometer was charged with 1000 parts of phenol and 692 parts of a 37% aqueous solution of formaldehyde and 4.5 parts of 20% hydrochloric acid, and they were heated with stirring. At about 97° C., refluxing began. After the start of refluxing, the reaction was further performed for 60 minutes under reflux. After the reaction, dehydration and the removal of the unreacted phenol were performed in a customary manner to afford 1050 parts of phenol novolak having a softening point of 100° C.

B. Production of resin-coated sand

To each of the phenolic resins obtained by the procedures set forth in A above was added 15% by weight, based on the phenolic resin, of hexamethylenetetramine. Three parts of the resulting powder was dissolved in 3 parts of a mixture of toluene and methanol (1:1 by weight). The solution was added to 100 parts of sand (flattery sand) and they were kneaded. Furthermore, 0.1 part of calcium stearate was added, and the mixture was kneaded to afford a resin-coated sand. The resin-coated sand was put into a mold and heated at 250° C. for 60 seconds to form a shell foundry mold.

The properties of the resulting foundry molds are shown in Table 1.

TABLE 1

| Resin | I | II | III | IV (comparison) |
|---|---|---|---|---|
| Shell bending strength at room temperature (kgf/cm²) (*1) | 42.7 | 37.2 | 39.3 | 34.4 |
| Coefficient of expansion (%) (*2) | 0.81 | 0.68 | 0.47 | 1.25 |
| Crack test (sec.) | 65 | 73 | 88 | 30 |

TABLE 1-continued

| Resin | I | II | III | IV (comparison) |
|---|---|---|---|---|
| (*3) | | | | |

(*1): Tested in accordance with JIS (Japanese Industrial Standards) K-6910.
(*2): Tested in accordance with JACT (Japanese Association of Casting Technology) test method SM-7. A cylindrical test specimen is heated to 1200° C., and the amount of its linear expansion in the direction of its height is measured and expressed in percentage based on the original size.
(*3): Tested in accordance with JACT testing method SM-9. The longer the crack test time, the better the crack resistance of the specimen.

It is seen from the results shown in Table 1 that the resins in accordance with this invention contribute to improved flexural strength in foundry molds produced by using them as a binder, and because of this low coefficient of expansion, the foundry molds produced have very good resistance to cracking.

EXAMPLE 2

A. Production of a phenolic resin

Resin V

Phenol (400 parts), 100 parts of a high-molecular-weight phenolic compound, 280 parts of a 37% aqueous solution of formaldehyde and 0.4 part of 20% hydrochloric acid were mixed, and heated with stirring. In 30 minutes after the starting of refluxing, 2.0 parts of 20% hydrochloric acid was added, and the reaction was performed for 30 minutes. After the reaction, dehydration and the removal of the unreacted phenol were performed in a customary manner to afford 505 parts of a phenolic resin having a softening point of 98° C.

B. Production of a phenolic resin molded article

One hundred parts of the resin V, 0.4 part of salicylic acid, 13 parts of hexamethylenetetramine, 1 part of calcium stearate and 100 parts of wood powder were kneaded by a roll at an elevated temperature. The kneaded mixture was injected into a mold at 180° C. by an injection molding machine, and cured at the same temperature for 90 seconds.

The properties of the resulting molded article are shown in Table 2 in comparison with those of a molded article prepared from resin IV (comparison).

TABLE 2

| Resin | V | IV (comparison) |
|---|---|---|
| Flexural strength (kgf/mm²) (*1) | 9.6 | 9.0 |
| Charpy impact strength (kgf . cm/cm²) (*2) | 2.6 | 2.3 |
| Barcol hardness (*3) | 56 | 62 |
| Residence time (seconds) (*4) | 210 | 120 |

(*1): Measured in accordance with JIS K-6911.
(*2): Measured in accordance with JIS K-6911.
(*3): Measured 60 seconds after withdrawal from the mold by a Barcol Impressor (Model GYZJ-934-1, a product of Barber Colman Company).
(*4): A molding material is injected after it has been caused to reside in the cylinder of an injection molding machine for a predetermined period of time, and the limit of the residence time which causes a failure of injection is determined. The longer the residence time, the more thermally stable the molding material.

It is seen from the results shown in Table 2 that the resin in accordance with this invention gives a molded article of improved flexural strength, and the heat stability of the resin in the cylinder of the injection molding machine is excellent.

What we claim is:

1. In a process for producing a phenolic resin which comprises condensing a phenol component and an aldehyde component; the improvement wherein the phenol component comprises high-molecular-weight phenolic compounds which are left after bisphenol A-containing by-products formed in the production of bisphenol A by condensing acetone and phenol in the presence of an acid catalyst are treated at a temperature of at least 150° C. in the presence of an alkaline catalyst to remove low-boiling components therefrom.

2. The process of claim 1 wherein the phenol component is a mixture of said high-molecular-weight phenolic compounds with phenol.

3. The process of claim 2 wherein the mixture is composed of 80 to 10% by weight of the high-molecular-weight phenolic compounds and 20 to 90% by weight of phenol.

4. The process of claim 1, 2, or 3 wherein said bisphenol A-containing by-products comprise dihydroxydiphenylpropane isomers, a chromane compound, and bisphenol A.

5. The process of claim 4 wherein said treatment of said by-products is at a pressure of not more than 100 mmHg.

6. The process of claim 4 wherein said alkaline catalyst cleaves the hydroxydiphenylpropane isomers to form phenol and isopropenyl phenol which are removed as low-boiling components.

7. The process of claim 1 wherein the phenol component and the aldehyde component are condensed in the presence of hydrochloric acid, sulfuric acid, or oxalic acid, the amount of the acid catalyst is 0.01 to 2 parts by weight per 100 parts by weight of the phenol component, the amount of the aldehyde component is 0.5 to 1.5 moles per mole of the phenol component, and the reaction temperature is 50° to 100° C.

* * * * *